US011895559B2

(12) United States Patent
Nakagawa et al.

(10) Patent No.: US 11,895,559 B2
(45) Date of Patent: Feb. 6, 2024

(54) MOVING MEANS DETERMINATION DEVICE

(71) Applicant: NTT DOCOMO, INC., Chiyoda-ku (JP)

(72) Inventors: Tomohiro Nakagawa, Chiyoda-ku (JP); Takuya Doumen, Chiyoda-ku (JP); Chao Xue, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 408 days.

(21) Appl. No.: 17/286,745

(22) PCT Filed: Jul. 23, 2019

(86) PCT No.: PCT/JP2019/028896
§ 371 (c)(1),
(2) Date: Apr. 19, 2021

(87) PCT Pub. No.: WO2020/121585
PCT Pub. Date: Jun. 18, 2020

(65) Prior Publication Data
US 2021/0385616 A1    Dec. 9, 2021

(30) Foreign Application Priority Data

Dec. 13, 2018  (JP) .................. 2018-233517

(51) Int. Cl.
*H04W 4/02*  (2018.01)
*G06N 20/00*  (2019.01)
*G06Q 20/32*  (2012.01)

(52) U.S. Cl.
CPC ............ *H04W 4/027* (2013.01); *G06N 20/00* (2019.01); *G06Q 20/3224* (2013.01)

(58) Field of Classification Search
CPC ...... H04W 4/027; H04W 4/029; G06N 20/00; G06N 5/01; G06Q 20/3224; G06Q 50/10; G06Q 50/30; G01C 21/20; B61L 25/02
(Continued)

(56) References Cited

U.S. PATENT DOCUMENTS 9,167,389 B1 * 10/2015 Murchison ............ H04W 4/027
2012/0184287 A1 * 7/2012 Jovicic .................. G01S 5/0289
455/456.1
(Continued)

FOREIGN PATENT DOCUMENTS

JP   2011-148415 A   8/2011
JP   2012-3494 A     1/2012
(Continued)

OTHER PUBLICATIONS

International Preliminary Report on Patentability and Written Opinion dated Jun. 24, 2021 in PCT/JP2019/028896 (submitting English translation only), 7 pages.
International Search Report dated Sep. 17, 2019 in PCT/JP2019/028896 filed on Jul. 23, 2019, 1 page.
Office Action dated Jul. 25, 2023, in corresponding Japanese Patent Application No. 2020-559700 (with English Translation), 8 pages.

*Primary Examiner* — Don N Vo
(74) *Attorney, Agent, or Firm* — Oblon, McClelland, Maier & Neustadt, L.L.P.

(57) ABSTRACT

An object is to provide a moving route determination device that makes it possible to accurately determine a user's moving route.
A server device 100 includes a geofence evaluation unit 105 configured to store a scoring table for determining a moving route of a user terminal 200, a check-in log acquisition unit 103 configured to acquire at least one of a check-in log which is a history of position management information, such as check-in information, settlement information, or search information, indicating that the user terminal 200 is located in a predetermined range, a settlement log, and a search log
(Continued)

as a position management log, and a scoring determination unit 106 configured to determine a moving route of the user terminal 200 on the basis of the position management log and determination information stored in the geofence evaluation unit 105 in a case where a moving means is not able to be determined from at least one of the check-in log, the settlement log, and the search log.

7 Claims, 18 Drawing Sheets

(58) Field of Classification Search
 USPC ..................................................... 455/456.1
 See application file for complete search history.

(56) References Cited

U.S. PATENT DOCUMENTS

| | | | | |
|---|---|---|---|---|
| 2013/0122935 | A1* | 5/2013 | Das | H04W 4/029 |
| | | | | 455/456.6 |
| 2013/0261964 | A1* | 10/2013 | Goldman | G01C 21/206 |
| | | | | 324/207.13 |
| 2016/0316321 | A1* | 10/2016 | Lin | H04W 4/029 |

FOREIGN PATENT DOCUMENTS

| | | |
|---|---|---|
| JP | 2018-124126 A | 8/2018 |
| JP | 2018-195981 A | 12/2018 |

* cited by examiner

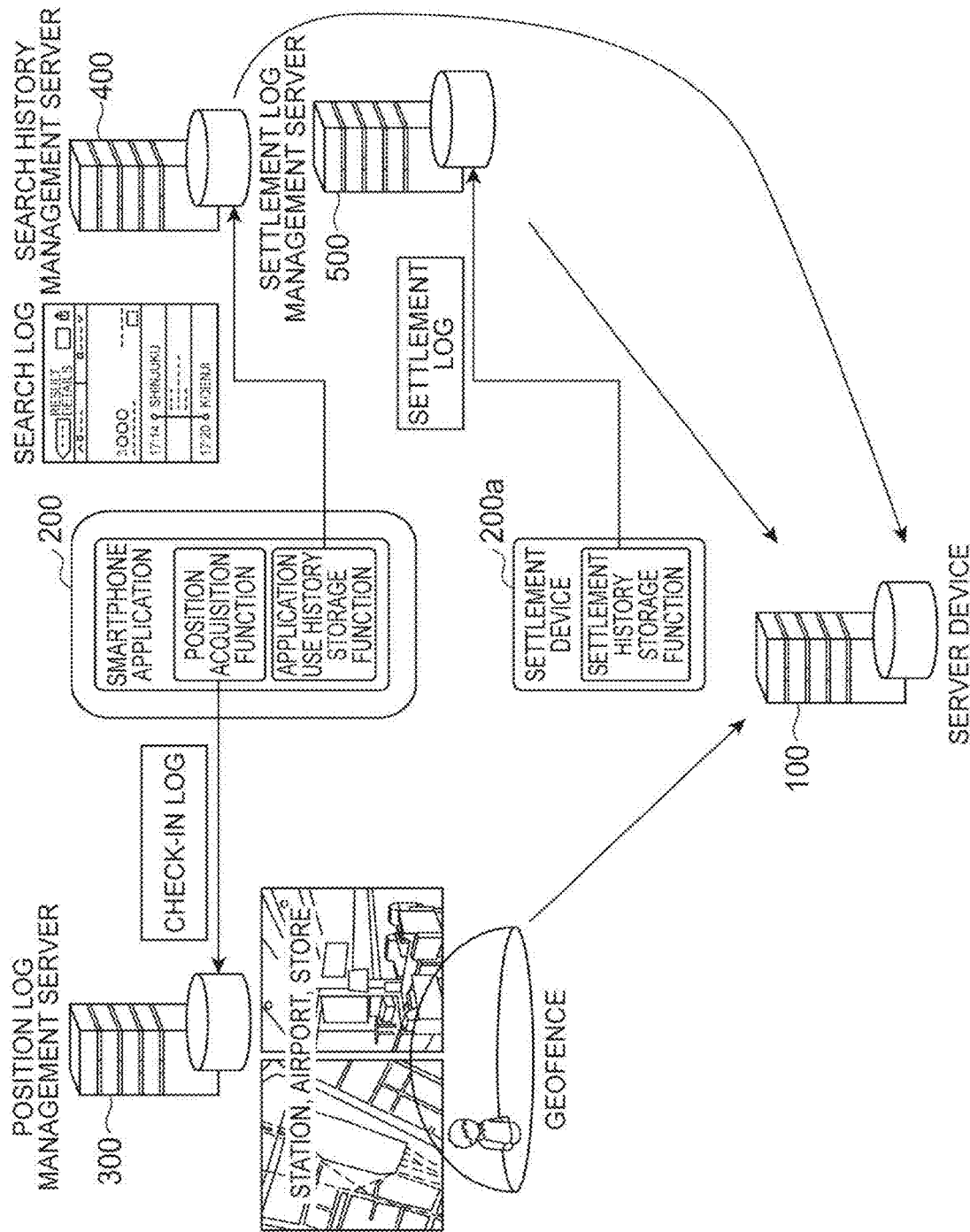

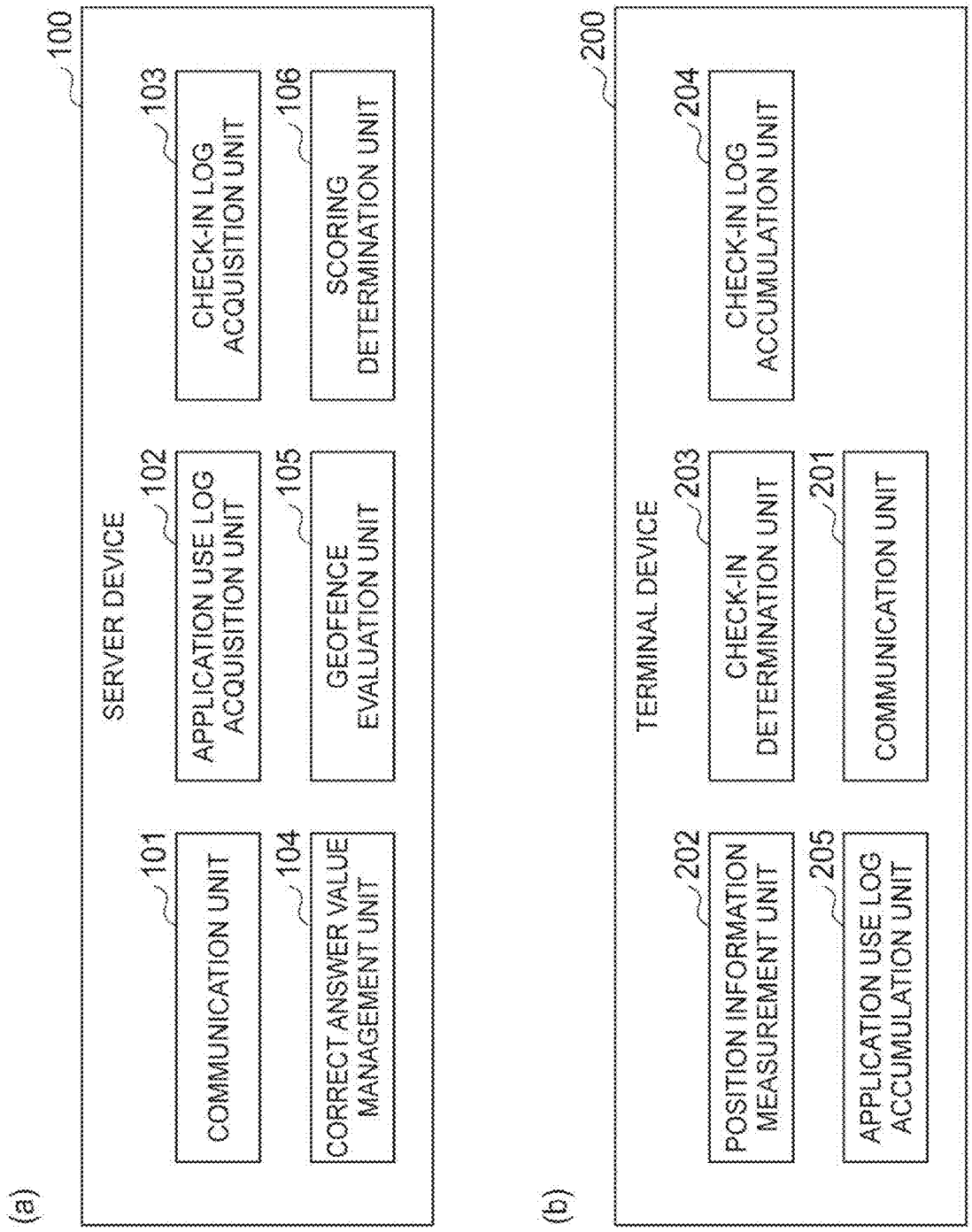

*Fig.3*

(a) SETTLEMENT LOG

| app_id | user_id | timestamp | address | cost |
|---|---|---|---|---|
| SETTLEMENT APPLICATION B | AA001 | 2018/08/27 11:01:00 | TAMEIKE-SANNO | ¥100 |
| SETTLEMENT APPLICATION B | AA001 | 2018/08/27 11:00:00 | SHOP IN SHIMBASHI STATION | ¥120 |

(b) SEARCH HISTORY OF TRANSFER GUIDANCE APPLICATION

| app_id | user_id | timestamp | departure | arrival | departure_time | arrival_time | transportation |
|---|---|---|---|---|---|---|---|
| TRANSFER GUIDANCE APPLICATION A | AA001 | 2018/08/27 09:01:00 | TAMEIKE-SANNO | SHIMBASHI | - | 2018/08/27 11:10:00 | train |
| TRANSFER GUIDANCE APPLICATION A | AA001 | 2018/08/27 18:00:00 | SHIMBASHI | AKIHABARA | 2018/08/27 18:05:00 | - | - |

(c) CHECK-IN LOG

| app_id | user_id | in_date | out_date | stay_time | point_id | point_name | category | point_type |
|---|---|---|---|---|---|---|---|---|
| TRANSFER GUIDANCE APPLICATION A | AA001 | 2018/08/27 11:00:00 | 2018/08/27 11:00:30 | 0:00:30 | 0001 | TAMEIKE-SANNO STATION GINZA LINE TICKET GATE 1 | RAILROAD TOKYO METRO GINZA LINE TICKET GATES | Beacon |
| TRANSFER GUIDANCE APPLICATION A | AA001 | 2018/08/27 11:00:00 | 2018/08/27 11:08:00 | 0:08:00 | 0002 | GINZA LINE CAR NO. 1 | RAILROAD TOKYO METRO GINZA LINE CAR NO. 1 | Beacon |

Fig.4

| | | | | | | | | CHECK-IN INFORMATION INCLUDING CORRECT ANSWER VALUE | | |
|---|---|---|---|---|---|---|---|---|---|---|
| app_id | user_id | in_date | out_date | stay_time | point_id | point_name | category | address | departure | arrival |
| TRANSFER GUIDANCE APPLICATION A | AA001 | 2018/08/27 09:01:00 | ... | ... | ... | ... | ... | ... | TAMEIKE-SANNO | SHIMBASHI |
| TRANSFER GUIDANCE APPLICATION A | AA001 | 2018/08/27 11:00:00 | 2018/08/27 11:00:30 | 0:00:30 | 0001 | TAMEIKE-SANNO STATION GINZA LINE TICKET GATE 1 | RAILROAD TOKYO METRO GINZA LINE TICKET GATES | ... | ... | ... |
| TRANSFER GUIDANCE APPLICATION A | AA001 | 2018/08/27 11:00:00 | 2018/08/27 11:08:00 | 0:08:00 | 0002 | GINZA LINE CAR NO. 1 | RAILROAD TOKYO METRO GINZA LINE CAR NO. 1 | ... | ... | ... |
| SETTLEMENT APPLICATION B | AA001 | 2018/08/27 11:01:00 | ... | ... | ... | ... | ... | SHOP IN TAMEIKE-SANNO STATION | ... | ... |
| TRANSFER GUIDANCE APPLICATION A | AA001 | 2018/08/27 11:00:00 | 2018/08/27 11:01:00 | 0:00:30 | 0003 | LAWSON STORE IN FRONT OF TAMEIKE STATION | LAWSON CONVENIENCE STORE | ... | ... | ... |
| TRANSFER GUIDANCE APPLICATION A | AA001 | 2018/08/27 11:00:00 | 2018/08/27 11:06:00 | 0:00:30 | 0004 | STARBUCKS COFFEE STORE IN FRONT OF TORANOMON STATION | RESTAURANT COFFEE SHOP STARBUCKS COFFEE | ... | ... | ... |
| TRANSFER GUIDANCE APPLICATION A | AA001 | 2018/08/27 11:00:00 | 2018/08/27 11:07:00 | 0:00:30 | 0005 | YAMADA DENKI LABI SHIMBASHI | SHOPPING HOME APPLIANCE YAMADA DENKI | ... | ... | ... |
| ... | ... | ... | ... | ... | ... | ... | ... | ... | ... | ... |
| ... | ... | ... | ... | ... | ... | ... | ... | ... | ... | ... |

CHECK-IN INFORMATION INCLUDING MONITORING GEOFENCE

Fig.6

(a) CHECK-IN LOG

| user_id | in_date | stay_time | point_id | category |
|---|---|---|---|---|
| AA0001 | t1 | s1 | p1 | r1 |
| AA0001 | t11 | s11 | p11 | - |
| AA0001 | t12 | s12 | p12 | r2 |
| AA0002 | t2 | s2 | p1 | r1 |
| AA0002 | t21 | s21 | p21 | - |
| AA0003 | t3 | s3 | p3 | r2 |
| AA0003 | t31 | s31 | p31 | - |
| ... | | | | |

(b) CHECK POINT IN ROUTE r1

| user_id | in_date | stay_time | point_id |
|---|---|---|---|
| AA0001 | t1 | s1 | p1 |
| AA0001 | t11 | s11 | p11 |
| AA0002 | t2 | s2 | p1 |
| AA0002 | t21 | s21 | p21 |

(c) NUMBER OF USERS FOR EACH CHECK POINT IN ROUTE r1

| point_id | NUMBER OF USERS | stay_average_time |
|---|---|---|
| p1 | 2 | sa1 |
| p11 | 1 | sa11 |
| p21 | 1 | sa21 |

Fig.7

| GEOFENCE | GINZA LINE | YAMANOTE LINE | TOKYO MONORAIL | KEIHIN-TOHOKU LINE | ... |
|---|---|---|---|---|---|
| LAWSON STORE IN FRONT OF TAMEIKE STATION | 0.8 | 0.5 | 0 | 0 | ... |
| STARBUCKS COFFEE STORE IN FRONT OF TORANOMON STATION | 0.8 | 0.5 | 0 | 0.1 | ... |
| YAMADA DENKI LABI SHIMBASHI | 0.8 | 0.6 | 0 | 0 | ... |
| AOYAMA 1-CHOME STATION | 0.8 | 0.6 | 0 | 0 | ... |
| AKASAKA-MITSUKE STATION | 0.5 | 0.6 | 0 | 0 | ... |
| TAMEIKE-SANNO STATION | 0.5 | 0.2 | 0.1 | 0 | ... |
| TORANOMON STATION | 0.5 | 0.3 | 0 | 0 | ... |
| FAMILYMART IN FRONT OF SHIMBASHI STATION | 0.7 | 0.5 | 0 | 0.3 | ... |
| TENNOUZUAIRU STATION | 0 | 0.1 | 0.8 | 0.8 | ... |
| TORANOMON HILLS | 0.5 | 0 | 0.8 | 0.8 | ... |
| UENO ZOO | 0.1 | 0.5 | 0.3 | 0.4 | ... |
| SHOUWAJIMA STATION | 0 | 0 | 0.8 | 0.7 | ... |
| SEIBIJOU STATION | 0 | 0 | 0.3 | 0.2 | ... |

*Fig.9*

(a) CHECK-IN LOG

| app_id | user_id | in_date | out_date | point_id | category |
|---|---|---|---|---|---|
| TRANSFER GUIDANCE APPLICATION A | AA001 | xx/xx/xx | xx/xx/xx | 0001 | |
| TRANSFER GUIDANCE APPLICATION A | AA001 | xx/xx/xx | xx/xx/xx | 0003 | LINE X TICKET GATES IN STATION A |
| TRANSFER GUIDANCE APPLICATION A | AA001 | xx/xx/xx | xx/xx/xx | 0005 | LINE X |
| | | | | | |
| | | | | | |
| | | | | | |
| | | | | | |

(b) CHECK-IN LOG

| app_id | user_id | in_date | out_date | point_id | category |
|---|---|---|---|---|---|
| TRANSFER GUIDANCE APPLICATION A | AA002 | xx/xx/xx | xx/xx/xx | 0002 | |
| TRANSFER GUIDANCE APPLICATION A | AA002 | xx/xx/xx | xx/xx/xx | 0001 | |
| | | | | | |
| | | | | | |
| | | | | | |
| | | | | | |

| app_id | user_id | in_date | out_date | point_id | category |
|---|---|---|---|---|---|
| TRANSFER GUIDANCE APPLICATION A | AA001 | xx/xx/xx | xx/xx/xx | 0001 | |
| TRANSFER GUIDANCE APPLICATION A | AA001 | xx/xx/xx | xx/xx/xx | 0003 | LINE X TICKET GATES IN STATION A |
| TRANSFER GUIDANCE APPLICATION A | AA001 | xx/xx/xx | xx/xx/xx | 0005 | LINE X |
| | | | | | |
| | | | | | |
| | | | | | |
| | | | | | |

(b)

| app_id | user_id | in_date | out_date | point_id | category |
|---|---|---|---|---|---|
| TRANSFER GUIDANCE APPLICATION A | AA002 | xx/xx/xx | xx/xx/xx | 0002 | |
| TRANSFER GUIDANCE APPLICATION A | AA002 | xx/xx/xx | xx/xx/xx | 0001 | |
| TRANSFER GUIDANCE APPLICATION A | AA002 | xx/xx/xx | xx/xx/xx | 0005 | LINE X |
| | | | | | |
| | | | | | |
| | | | | | |
| | | | | | |

(c) MOVING ROUTE X

| point_id | NUMBER OF USERS | AVERAGE STAY TIME | MOVING TIME OF ADJACENT P1 | MOVING TIME OF ADJACENT P2 | ... |
|---|---|---|---|---|---|
| 0001 | xx | xx | xx | xx | |
| 0002 | xx | xx | xx | xx | |
| ... | | ... | | | |

MOVING MEANS DETERMINATION DEVICE

TECHNICAL FIELD

The present invention relates to a moving means determination device that determines a moving route of a user terminal.

BACKGROUND ART

Patent Literature 1 discloses that a use line is judged using position information of a user and network data.

CITATION LIST

Patent Literature

[Patent Literature 1] Japanese Unexamined Patent Publication No. 2011-148415

SUMMARY OF INVENTION

Technical Problem

However, in the technique disclosed in Patent Literature 1, in a case where an adjacent different moving route is present, there is a problem in that the moving route cannot be accurately determined.

Consequently, in order to solve the above-described problem, an object of the present invention is to provide a moving means determination device that makes it possible to accurately determine a user's moving route.

Solution to Problem

According to the present invention, there is provided a moving means determination device including a determination information storage unit configured to store determination information for determining a moving means of a user terminal using monitoring position identification information established in advance; a log acquisition unit configured to acquire a history of position management information indicating that the user terminal is located in a predetermined range as a position management log; and a moving means determination unit configured to determine the moving means of the user terminal on the basis of the position management log and the determination information stored in the determination information storage unit in a case where a moving means is not able to be determined from the position management log.

According to this invention, it is possible to determine the moving means using the monitoring position identification information, to reduce the amount of data processing, and to improve the accuracy of determination.

Advantageous Effects of Invention

According to the present invention, it is possible to accurately determine a user's moving route.

BRIEF DESCRIPTION OF DRAWINGS

FIG. 1 is a diagram illustrating a system configuration of a communication system including a server device 100 according to an embodiment of the present disclosure.

FIG. 2 is a block diagram illustrating functional configurations of the server device 100 and a user terminal 200.

FIG. 3 is a diagram illustrating specific examples of a settlement log, a search log and a check-in log.

FIG. 4 is a diagram illustrating a check-in log (including a settlement log or the like) including a correct answer value and a monitoring check-in log.

FIG. 6 is a diagram illustrating generation of a histogram.

FIG. 7 is a scoring table illustrating coefficients of moving routes.

FIG. 9 shows check-in logs of the user A0001 and the user A0002.

FIG. 14 is a diagram illustrating check-in logs of the user A0001 and the user A0002, and behaviors of the users with respect to a moving route.

FIG. 16 is a flow chart illustrating a method of generating a learning model in the server device 100a.

DESCRIPTION OF EMBODIMENTS

Figure 5:
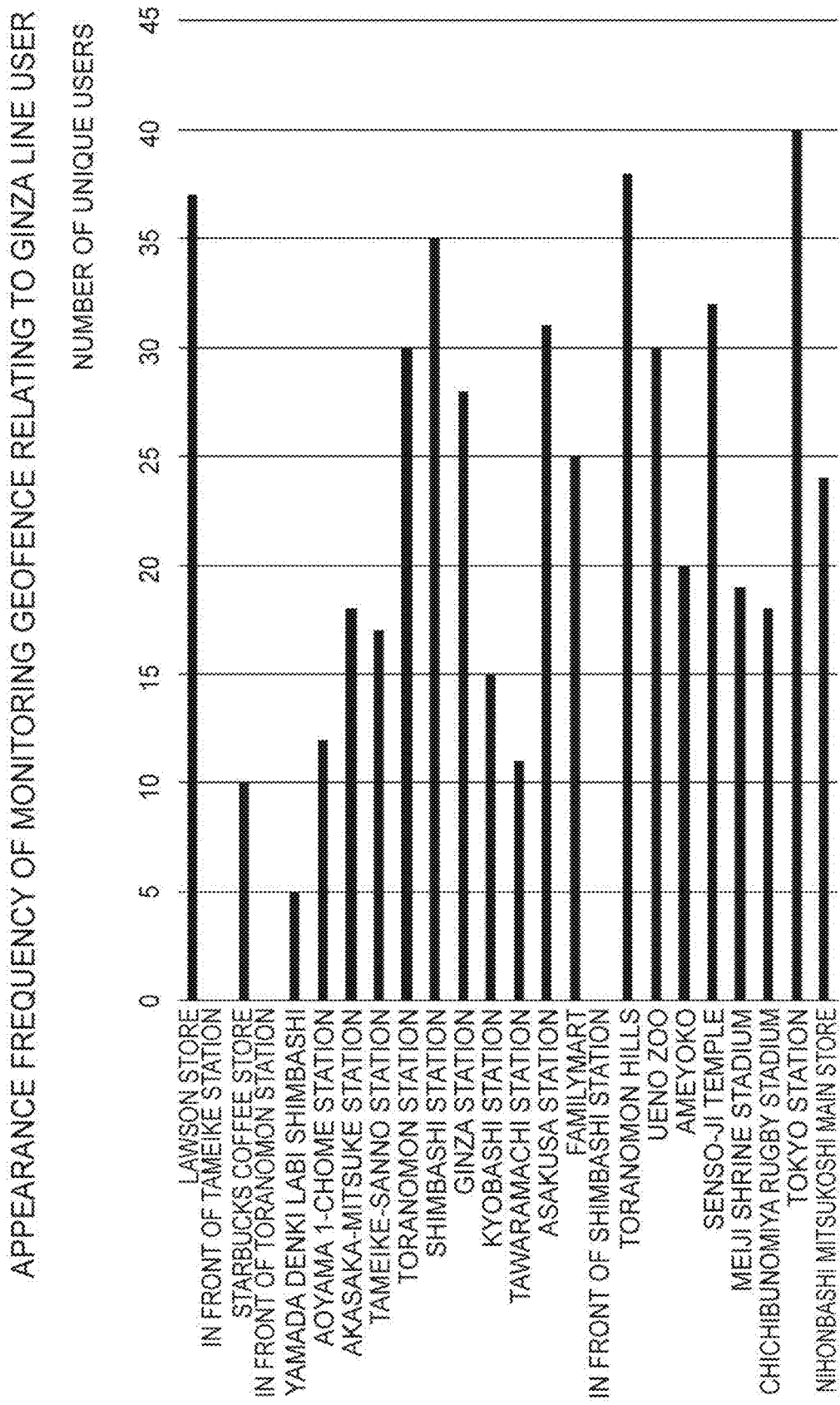
FIG. 5 is a diagram illustrating a histogram for each line.

An embodiment of the present invention will be described with reference to the accompanying drawings. The same components are denoted, if possible, by the same reference numerals and signs, and thus description thereof will not be repeated.

FIG. 1 is a diagram illustrating a system configuration of a communication system including a server device 100 according to an embodiment of the present disclosure. As shown in the drawing, this communication system is configured to include the server device 100 (a moving means determination device), a user terminal 200, a settlement device 200a, a position log management server 300, a search history management server 400, and a settlement log management server 500. The position log management server 300 is an essential server, and the search history management server 400 and the settlement log management server 500 are not necessarily required.

The server device 100 collects check-in information (information indicating being in a predetermined range), settlement information, search information and the like of the user terminal 200 from the position log management server 300, the search history management server 400, and the settlement log management server 500. The position log management server 300 collects information indicating entering a predetermined geofence on the basis of position information acquired by the user terminal 200 through GPS, WIFI, Bluetooth (a beacon), or the like. In the present specification, the term "geofence" represents a virtual geographical range determined in advance, and information indicating entering the geofence is referred to as check-in information.

A plurality of geofences are set for each predetermined check-in point (position identification information), and are defined in a position acquisition function of the user terminal 200. In a case where the user terminal 200 has acquired position information through GPS, the user terminal 200 can determine that it is within a geofence in accordance with whether the position information is a range defined by a geofence. In a case where the user terminal 200 has entered a geofence at a timing of acquisition (a predetermined period) of position information, the user terminal acquires check-in information. Therefore, in a case where the user terminal 200 does not enter a geofence at a timing of acquisition of position information, the user terminal does not acquire check-in information. In addition, check-in information may not be able to be acquired through the acquired position information. The check-in information is information including a category and a check-in point (identified by point_id or point_name) determined in advance in accordance with its position, as will be described later.

It may be determined whether the user terminal is within a geofence by receiving a signal such as an SSID through WIFI. In that case, in the user terminal 200, a check-in point and a category are defined for each SSID (including a BSSID or the like) in advance, and check-in information is acquired on the basis thereof. A geofence can also be defined by a beacon or the like. In this case, a check-in point and a category are included in a beacon, and check-in information is acquired on the basis thereof.

The server device 100 determines through which moving route the user terminal 200 has moved on the basis of a check-in log which is a history of check-in information collected from each of the user terminals 200. The moving route represents, for example, the line (a use route) of a railroad (a moving means), and Ginza Line of Tokyo Metro or the like.

In order to cause the server device 100 to determine a moving route, the user terminal 200 transmits a check-in log, a settlement log, and search history information periodically or immediately to the position log management server 300, the search history management server 400, and the settlement log management server 500. The user terminal 200 has a position acquisition function and an application use history storage function, and each function transmits necessary information. In addition, the settlement device 200a is a device that performs electronic settlement by communicating with the user terminal 200. When the user terminal 200 performs a settlement process, the settlement device 200a transmits its settlement information to the settlement log management server 500.

Next, functional configurations of the server device 100 and the user terminal 200 will be described. FIG. 2 is a block diagram illustrating functional configurations of the server device 100 and the user terminal 200. As shown in the drawing, the server device 100 includes a communication unit 101, an application use log acquisition unit 102 (a log acquisition unit), a check-in log acquisition unit 103 (a log acquisition unit), a correct answer value management unit 104 (a monitoring information acquisition unit), a geofence evaluation unit 105 (a determination information storage unit, a coefficient calculation unit), and a scoring determination unit 106 (a moving means determination unit).

The communication unit 101 is a portion that performs communication with each server such as the position log management server 300 and collects various types of information such as a check-in log.

The application use log acquisition unit 102 is a portion that acquires log information (a settlement log or a search log) of a used application from the search history management server 400 or the settlement log management server 500. FIGS. 3(a) and 3(b) are diagrams illustrating specific examples of a settlement log and a search log. As shown in the drawing, the settlement log is constituted by a plurality of pieces of settlement information. The settlement information includes an app_id, a user_id, a timestamp, an address, and a cost. The app_id is an ID for identifying a settlement application, the user_id is an ID for identifying a user, the timestamp represents the date and time when its settlement application is used, the address represents a place where its settlement application is used, and the cost represents the amount of money used in its settlement application. The user terminal 200 uses its electronic money function to perform an exchange of store information, a settlement time, the amount of money, or the like between a settlement terminal located in a store and the user terminal.

The search log includes an app_id, a user_id, a timestamp, departure, arrival, a departure_time, an arrival_time, and transportation. The app_id is an ID for identifying a search application, the user_id is an ID for identifying a user, the timestamp represents the date and time when its search application is used, the departure represents a point of departure, the arrival represents a point of arrival, the departure_time represents a time of departure, and the arrival_time represents a time of arrival. In addition, the transportation represents a moving means.

The check-in log acquisition unit 103 is a portion that acquires and stores a check-in log which is a history of check-in information from the position log management server 300. The check-in log is a history of check-in information shown in FIG. 3(c). For example, the position log management server 300 acquires an app_id, a user_id, an in_date, an out_date, a stay_time, a point_id, a point_name, a category, and a point_type as the check-in information. The app_id represents a used application. The user_id is an ID for identifying a user. The in_date is the date and time when a user terminal enters a geofence. The out_date is the date and time when a user terminal leaves a geofence. The stay_time is a time for which a user terminal stays within a geofence. The point_name represents the name of a geofence. The category is attribute information for identifying a place, a railroad line or the like which is associated with a geofence. In FIG. 3, for example, "Railroad Tokyo Metro Ginza Line Ticket Gates" is described in the column of the category, and its check-in point represents the ticket gates in Tokyo Metro Ginza Line. The point_type represents the type of acquisition for acquiring position information. In FIG. 3, Beacon is described in the column of the point_type. The user terminal 200 receives a predetermined beacon, and thus can identify category information according to an ID of the beacon on the basis of information of a management table determined in advance. Meanwhile, category information according to a position and category information according to a received service set identifier (SSID) or the like can be similarly identified in GPS and WIFI, respectively, on the basis of the information of a management table determined in advance.

The correct answer value management unit 104 is a portion that acquires a monitoring geofence (equivalent to monitoring check-in information and monitoring position identification information) from the check-in log and the settlement log. The term "monitoring geofence" refers to a geofence defined by a check-in point of check-in information acquired within a predetermined time before and after check-in information including a correct answer value among geofences defined by check-in points of check-in information not including a correct answer value (information for identifying a place or a line). A correct answer value in the check-in information including a correct answer value which is a reference of the acquisition is associated with the check-in information of this monitoring geofence. For example, a correct answer value of check-in information acquired immediately before is described in the category information of the check-in information of the monitoring geofence.

Meanwhile, the monitoring geofence may be associated in advance with a check-in point including a correct answer value. The monitoring geofence is a check-in point associated with the check-in point including a correct answer value.

A method of acquiring a monitoring geofence in the correct answer value management unit 104 will be described with reference to FIG. 4.

FIG. 4 is a diagram illustrating a check-in log, a search log and a settlement log including a so-called correct answer value, and a check-in log in which check-in is performed at another check-in point with a predetermined time from a time at which check-in has been performed at a check-in point which is a correct answer value. The correct answer value is defined by a point_id, a point_name, and a category being registered with a correct answer value database (not shown) in advance. In the correct answer value database, in a case where "0001," "Tameike-Sanno Station Ginza Line Ticket Gate 1," and "Railroad Tokyo Metro Ginza Line Ticket Gates" are registered as the point_id, the point_name, and the category, respectively, the correct answer value management unit 104 determines that check-in information coincident with these items has a correct answer value. The same is true of the settlement log. On the other hand, the search log is expected to be a transfer search of the line of a railroad to ride from now on, and thus in the present specification, the search log is treated as including a correct answer value.

The correct answer value management unit 104 acquires a check-in log, a settlement log, and a search log at a predetermined timing from the position log management server 300 or the like through the communication unit 101. The acquired check-in log and settlement log include check-in information and a settlement log including a correct answer value, and check-in information and a settlement log not including a correct answer value.

In a case where there are check-in information and a settlement log not including a correct answer value in which check-in has been performed with a predetermined time from a check-in time (an in_date or an out_date) of check-in information or the like including a correct answer value, the correct answer value management unit 104 acquires a check-in point of the check-in information as a monitoring geofence. A correct answer value of check-in information including a correct answer value which is an acquisition reference is associated with the check-in information treated as the monitoring geofence. This is because there is a high possibility of a moving route indicated by the correct answer value being used in the check-in information not including a correct answer value in which check-in has been performed with a predetermined time from the check-in information including such a correct answer value.

The geofence evaluation unit 105 is a portion that evaluates the monitoring geofence extracted by the correct answer value management unit 104 and generates a scoring table (a database for determination). This scoring table is a table in which a coefficient calculated for each moving route (which is, for example, the line of a railroad in the present disclosure, and may be a road or the like as necessary) determined in advance is allocated to the monitoring geofence (each check-in point). This coefficient is obtained by calculating the appearance frequency of each check-in point, an average stay_time, and the like for each moving route determined in advance, and performing normalization and totalization on the basis of each value.

Hereinafter, a process of coefficient calculation in the scoring table in the geofence evaluation unit 105 will be described. FIG. 5 shows a histogram of monitoring geofence appearance frequency relating to Ginza Line users (the number of users). This is a graph in which the number of users is totaled for each check-in point (a point_id or a point_name) which is a monitoring geofence using check-in information of a monitoring geofence.

For example, in FIG. 5, "Lawson Store in front of Tameike Station," "Starbucks Coffee Store in front of Toranomon Station," and "Yamada Denki LABI Shimbashi" which are check-in points are monitoring geofences. They are check-in points acquired on the basis of check-in information not including a correct answer value which is within a predetermined time from check information of a correct answer value using "Tameike-Sanno Station Ginza Line Ticket Gate 1" as a check-in point (point_name in FIG. 4). Meanwhile, the station name of Aoyama 1-chome Station, Akasaka-Mitsuke Station, or the like is also treated as a monitoring geofence herein.

The process will be described with reference to FIG. 6. FIG. 6 is a diagram in which a check-in log and the like are simplified. FIG. 6(*a*) shows check-in logs of all users. In FIG. 6(*a*), r1 of the category represents a moving route. For example, it is Tokyo Metro Ginza Line or the like. In addition, "–" of the category represents that there is no correct answer value.

FIG. 6(*b*) shows a monitoring geofence in the route r1. This drawing is information in which only the route r1 is extracted from the check-in log of FIG. 6(*a*). FIG. 6(*c*) shows the number of users for each monitoring geofence in the route r1. The number of users is calculated for each point_id using FIG. 6(*b*).

The geofence evaluation unit 105 acquires a monitoring geofence from the check-in log (including a settlement log) (see FIG. 6(*a*)) for each moving route (for example, a line) of each user (see FIG. 6(*b*)).

FIG. 6(*b*) is a diagram in which check-in information having the route r1 described in the column of the category is extracted. Here, p1, p11, and p21 are extracted as point_ids of a monitoring geofence in the route r1.

Next, the geofence evaluation unit 105 calculates the number of users for each monitoring geofence in each moving route (see FIG. 6(*c*)). In this manner, the geofence evaluation unit 105 generates a histogram shown in FIG. 5. In addition, in parallel therewith, the geofence evaluation unit 105 calculates an average stay_time for each monitoring geofence. FIG. 6(*c*) is a diagram in which the number of users of each monitoring geofence is calculated with reference to FIG. 6(*b*). Meanwhile, the average stay_time (stay_average_time) is also calculated together.

The geofence evaluation unit 105 performs a normalization process for the number of users of a monitoring geofence and a normalization process for the average stay_time. The normalized value (an appearance frequency coefficient or a stay_time coefficient) is set as a coefficient (an appearance frequency coefficient or a stay_time coefficient) of each monitoring geofence in a moving route. This is performed for each moving route, whereby it is possible to calculate a coefficient (an appearance frequency coefficient or a stay_time coefficient) for each moving route.

FIG. 7 shows a scoring table of coefficients of a moving route (the total of appearance frequency coefficients (normalized) and stay_time coefficients (normalized)) for each monitoring geofence. These coefficients are numeric values calculated through the processes of FIGS. 6(a) to 6(c). As shown in FIG. 7, the moving route represents the line of a railroad. For example, the Lawson Store in front of Tameike Station which is a monitoring geofence is allocated coefficients of Ginza Line: 0.8, Yamanote Line: 0.5, Tokyo Monorail: 0, Keihin-Tohoku Line: 0, and so on. This indicates that a user who has performed check-in at the Lawson Store in front of Tameike Station uses the Ginza Line with a probability of 0.8. This scoring table is stored in the geofence evaluation unit 105.

The scoring determination unit 106 is a portion that determines a moving route to a destination designated in the user terminal 200 on the basis of the check-in log and the settlement log of the user terminal 200 and the scoring table of the geofence evaluation unit 105. The scoring determination unit 106 obtains statistical information (the number of users) of a moving route to a destination on the basis of the determined result. The result is displayed on a display as necessary, or is output to an operator terminal. Regarding the details of a scoring determination process, the following process is performed.

The scoring determination unit 106 designates a user ID, a destination and the like subject to the determination of a moving route (the date and time can also be designated as necessary), and uses the user ID and the destination, to thereby acquire the check-in log, the search log, and the settlement log (hereinafter referred to as the check-in log and the like) of the user terminal 200 from the position log management server 300, the search history management server 400 and the settlement log management server 500. A check-in log and the like of movement to a destination or the vicinity of the destination are acquired from the check-in log and the like. Whether being a destination or the vicinity of the destination can be determined on the basis of the category of check-in information, a place name of the address or the like, an address, or the like.

The scoring determination unit 106 determines whether a correct answer value is included for each check-in point in any of check-in information, search information, and settlement information of the check-in log and the like.

In a case where a correct answer value is included in the check-in information, a moving route corresponding to the correct answer value is determined as a moving route used by a user.

Further, the scoring determination unit 106 cannot determine a moving route directly in a case where a correct answer value is not included in the check-in information, or the remaining check-in information other than the check-in information including a correct answer value. Therefore, regarding the check-in information not including a correct answer value, a moving route is determined using the scoring table in the geofence evaluation unit 105.

For example, in a case where a correct answer value is not included in the check-in information, and check-in points in the check-in information are held as monitoring geofences in the scoring table of the geofence evaluation unit 105, the scoring determination unit 106 acquires a coefficient (an appearance frequency coefficient or a stay_time coefficient) for each moving route corresponding to each check-in point of the check-in information on the basis of the scoring table.

In a case where check-in information (not including a correct answer value) including a monitoring geofence is consecutive a predetermined number of times, the scoring determination unit 106 totals coefficients of check-in information consecutive for each moving route, determines whether the total is set to be equal to or greater than a threshold, and in a case where the total is set to be equal to or greater than the threshold, determines that a moving route in which the total is set to be equal to or greater than the threshold is a moving route used by a user at the check-in point including a monitoring geofence.

Meanwhile, in simple totalization, in a case where check-in points are dense, making an erroneous determination due to being pulled to these check-in points can be considered. Therefore, a determination is made using the scoring table in consideration of the check-in time (in_date) to a geofence. For example, regarding check-in information which is a target for totalization, thinning out the check-in information so as to provide spacing of a predetermined time makes it possible to perform a more accurate estimation.

Meanwhile, since a moving route cannot be determined in a case where check-in information including neither a monitoring geofence nor a correct answer value is consecutive a predetermined number of times, an error may be determined.

In addition, in a case where check-in information including a monitoring geofence and not including a correct answer value is less than a predetermined number of times, the scoring determination unit 106 determines that a correct answer value of check-in information including a correct answer value acquired before and after that is a moving route used by a user.

Figure 8:
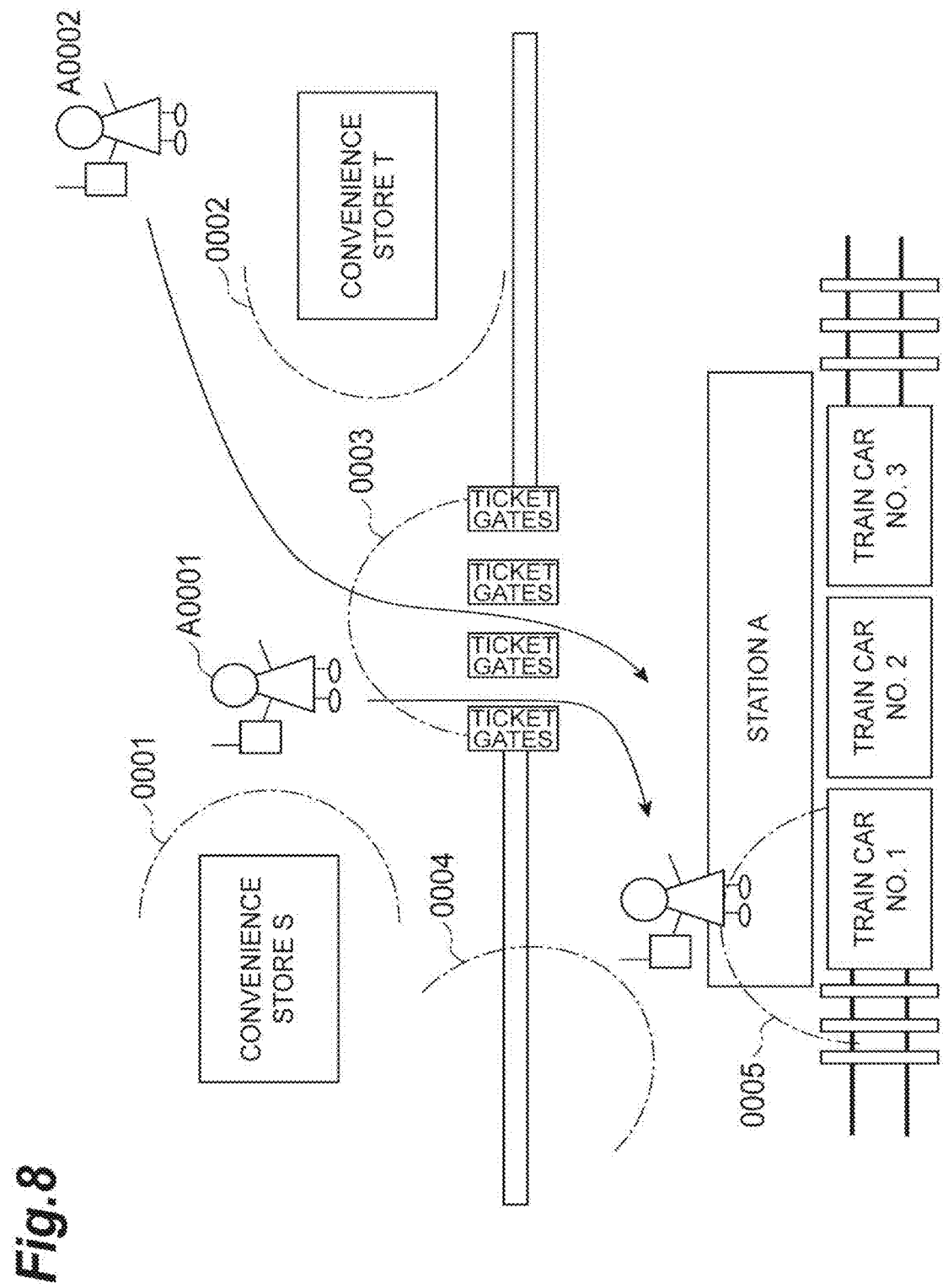
FIG. 8 is a diagram schematically illustrating moving trajectories of a user A0001 and a user A0002.

Processing when a moving route is determined will be described with reference to FIGS. 8 and 9. FIG. 8 is a diagram schematically illustrating a moving route of a user A0001 and a moving trajectory of a user A0002. FIG. 9 shows check-in logs of the user A0001 and the user A0002. As obvious from FIGS. 8 and 9(a), the user A0001 moves through a convenience store S (point_id: 0001), the ticket gates (point_id: 0003), and a train (point_id: 0005). In a case where the check-in information includes the ticket gates and is set as a correct answer value, the user A0001 can determine that a moving route to a destination is a train of a line X at a point in time when the ticket gates in the check-in information is set as a check-in point.

On the other hand, the check-in information of the user A0002 is assumed not to include a correct answer value. Both a convenience store T and the convenience store S are acquired as a check-in point. In such a case, when the convenience store T and the convenience store S are set as a monitoring geofence in the scoring table of the geofence evaluation unit 105, a moving route is determined on the basis of the coefficients.

The check-in information is acquired in accordance with a timing of check-in determination in the user terminal 200. Since the timing is not necessarily performed near a check-in point, as described above, check-in information including a correct answer value may not be obtained.

Subsequently, the functional configuration of the user terminal 200 will be described with reference to FIG. 2. The user terminal 200 includes a communication unit 201, a position information measurement unit 202, a check-in determination unit 203, a check-in log accumulation unit 204, and an application use log accumulation unit 205.

The communication unit 201 is a portion that performs communication with the position log management server 300, the search history management server 400, the settlement log management server 500, or the like. Log information (a check-in log, a search log, and a settlement log) stored in the check-in log accumulation unit 204 and the application use log accumulation unit 205 is periodically transmitted to each server.

The position information measurement unit 202 is a position acquisition function for measuring position information. For example, a position is measured using a GPS, WIFI, a beacon, or the like.

The check-in determination unit 203 is a portion that determines whether check-in has been performed in a geofence on the basis of measured position information. The check-in determination unit 203 stores information indicating a range of a geofence or the like in advance, and acquires check-in information on the basis of position information. The timing of determination of the check-in determination unit 203 is every predetermined interval (any period a few seconds to a few minutes).

The check-in log accumulation unit 204 is a portion that stores check-in information acquired by the check-in determination unit 203.

The application use log accumulation unit 205 is an application use history storage function for storing a use log of a search application or a settlement application. In the case of the search application, a departure point, an arrival point and its use scheduled line are stored in a transfer application. In the case of the settlement application, a used store, its category information (such as a place name), and the amount of settlement are stored.

Figure 10:
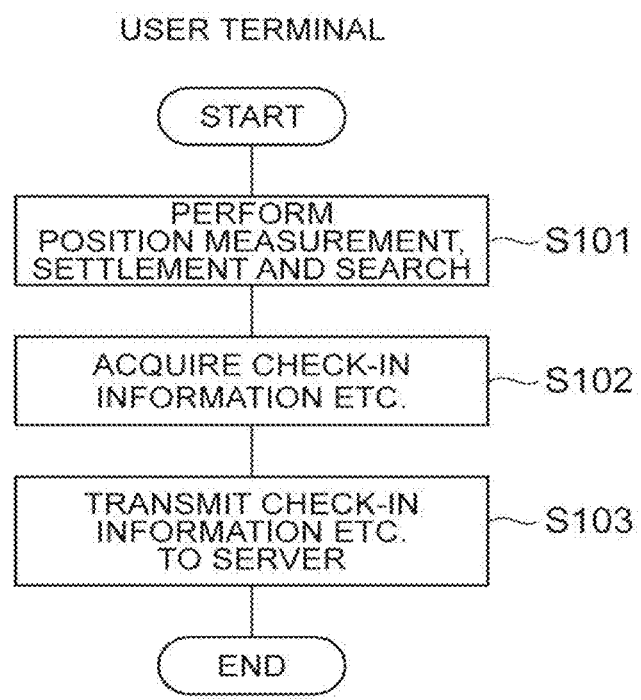
FIG. 10 is a flow chart of transmission of position measurement data in the user terminal 200.

Next, processes of the server device 100 and the user terminal 200 according to an aspect of the present disclosure will be described. FIG. 10 is a flow chart of transmission of position measurement data in the user terminal 200.

In the user terminal 200, the position information measurement unit 202 performs position measurement periodically, and the settlement application and the search application (not shown) perform a settlement process and a search process in accordance with a user's operation (S101). In the user terminal 200, the check-in determination unit 203 performs determination of check-in, other settlement processes or the like, and acquires check-in information or the like (other settlement information or search information) (S102). The position measurement is performed using a GPS, WIFI, or a beacon, and the check-in information is acquired in accordance therewith. Meanwhile, settlement information and search information are acquired in addition to the acquisition of the check-in information.

In the user terminal 200, the communication unit 201 transmits the check-in information, the settlement information, and the search information to each server (the position log management server 300, the search history management server 400, and the settlement log management server 500) (S103).

Figure 11:
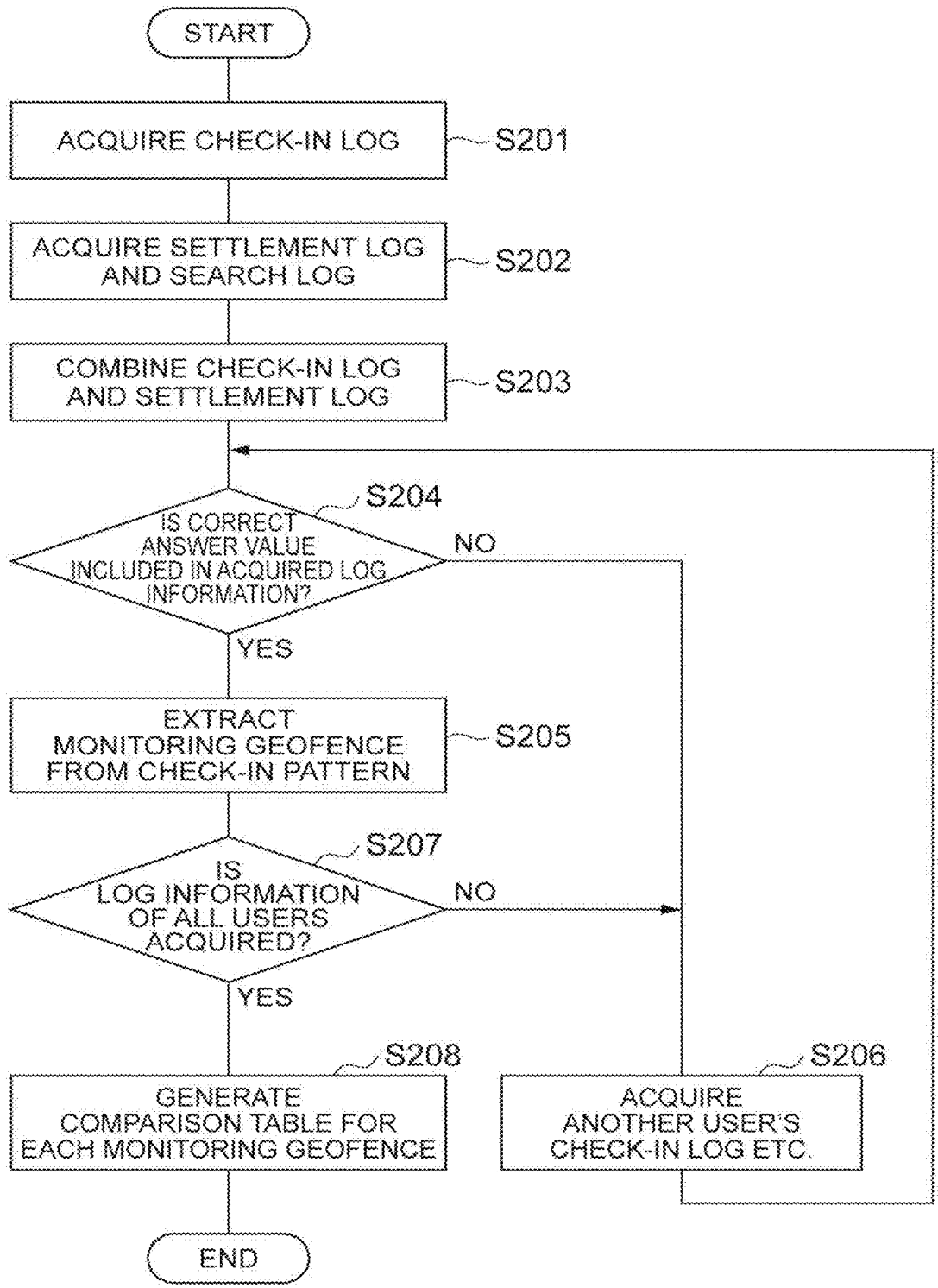
FIG. 11 is a flow chart for generating a scoring table in a geofence evaluation unit 105 of the server device 100.

FIG. 11 is a flow chart for generating a scoring table in the correct answer value management unit 104 and the geofence evaluation unit 105 of the server device 100. The check-in log acquisition unit 103 acquires a check-in log periodically from the position log management server 300 (S201). In addition, the application use log acquisition unit 102 acquires a settlement log from the search history management server 400 and the settlement log management server 500 (S202). The geofence evaluation unit 105 synthesizes the check-in log, the settlement log, and the search log to generate log information (S203).

Here, the correct answer value management unit 104 determines whether a correct answer value is included in the log information (S204). In a case where it is determined that the log information includes a correct answer value, the correct answer value management unit 104 extracts another check-in information and another settlement information within a predetermined time, as check-in information of a monitoring geofence, from the check-in information and the settlement information including a correct answer value in the log information (S205). This is repeatedly performed with respect to all users (S206, S207).

In S204, in a case where a correct answer value is not included in the acquired log information, a monitoring geofence cannot be acquired, and thus the check-in log acquisition unit 103 performs a process of acquiring a check-in log of another user or the like (S207). When the check-in information of monitoring geofences is extracted from all users, the geofence evaluation unit 105 generates a scoring table for these monitoring geofences (S208). The generation of this scoring table is as described above. This scoring table may be periodically updated.

Figure 12:
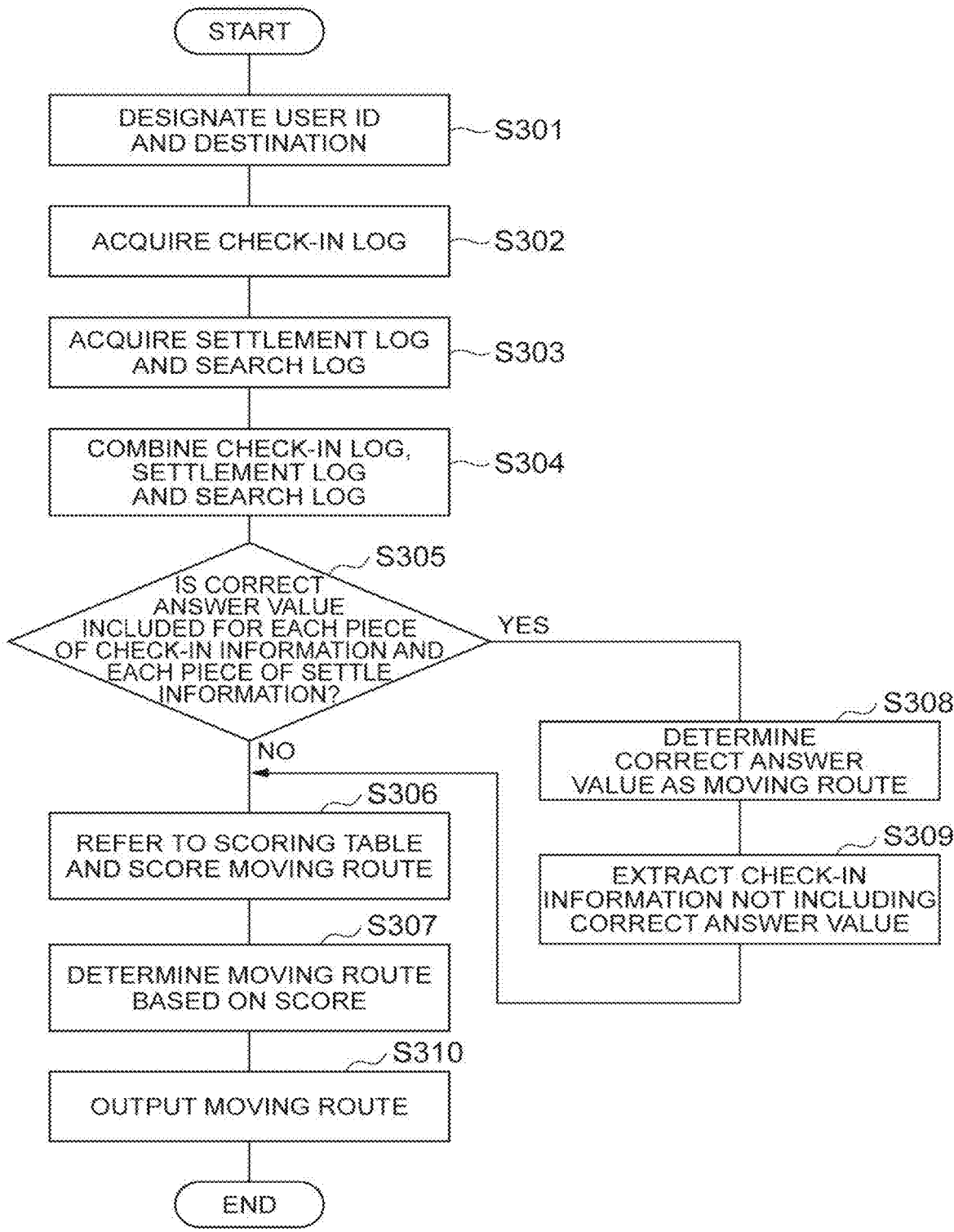
FIG. 12 is a flow chart illustrating a determination process of a moving route of a user in the server device 100.

Next, a process of determining a user's moving route will be described using this scoring table. FIG. 12 is a flow chart illustrating a process of determining a user's moving route in the server device 100. A target for acquisition of a check-in log is assumed to be different from a user used in the generation of a scoring table. The scoring determination unit 106 accepts designation of a user ID and a destination of a user who is a determination target (S301). The scoring determination unit 106 acquires a check-in log corresponding to a user ID from the position log management server 300 through the communication unit 101 on the basis of the designated destination (S302). In addition, the scoring determination unit 106 acquires a search log and a settlement log from the search history management server 400 and the settlement log management server 500 through the communication unit 101 (S303). The scoring determination unit 106 combines the acquired check-in log, search log, and settlement log to generate log information (S304).

The scoring determination unit 106 determines whether a correct answer value is included for each piece of check-in information (S305). In a case where it is determined that a correct answer value is not included in the log information, the scoring determination unit 106 performs scoring on each moving route using the scoring table in the geofence evaluation unit 105, and performs the determination of the moving route (S306, S307). That is, coefficients of the scoring table are cumulatively added for each moving route on the basis of the check-in information not including a correct answer value in the log information, and determines that a moving route in which the cumulatively added value is set to be equal to or greater than a threshold is a moving route used by a user.

On the other hand, in a case where it is determined that a correct answer value is included in the check-in information and the settlement information of the log information, the scoring determination unit 106 determines a moving route on the basis of the correct answer value (S308). Further, the check-in information and the settlement information not including a correct answer value are extracted, and a process of determining a moving route using the scoring table is performed (S306, S307).

A determination result indicating the determined moving route is output (S310). In the determination result, a moving route may be shown for each check-in point, and only a moving route may be shown in a time-series manner.

The scoring table is used in this manner, and thus a user's moving route can be determined using the log information not including a correct answer value. Meanwhile, the search information (a search log) is treated as a correct answer value, but it may be determined whether the search information is treated as a correct answer value with reference to an actual check-in log and a settlement log. That is, the search information may be determined not to be a correct answer value in a case where it can be determined that movement to the vicinity of a designated destination is not performed with reference to the check-in log and the settlement log. In addition, the search log is not necessarily used.

In the above disclosure, the geofence evaluation unit 105 uses the scoring table in which scoring coefficients of a monitoring geofence and a moving route are compared with each other, but there is no limitation thereto. For example, a learning model can be used instead of the scoring table.

Figure 13:
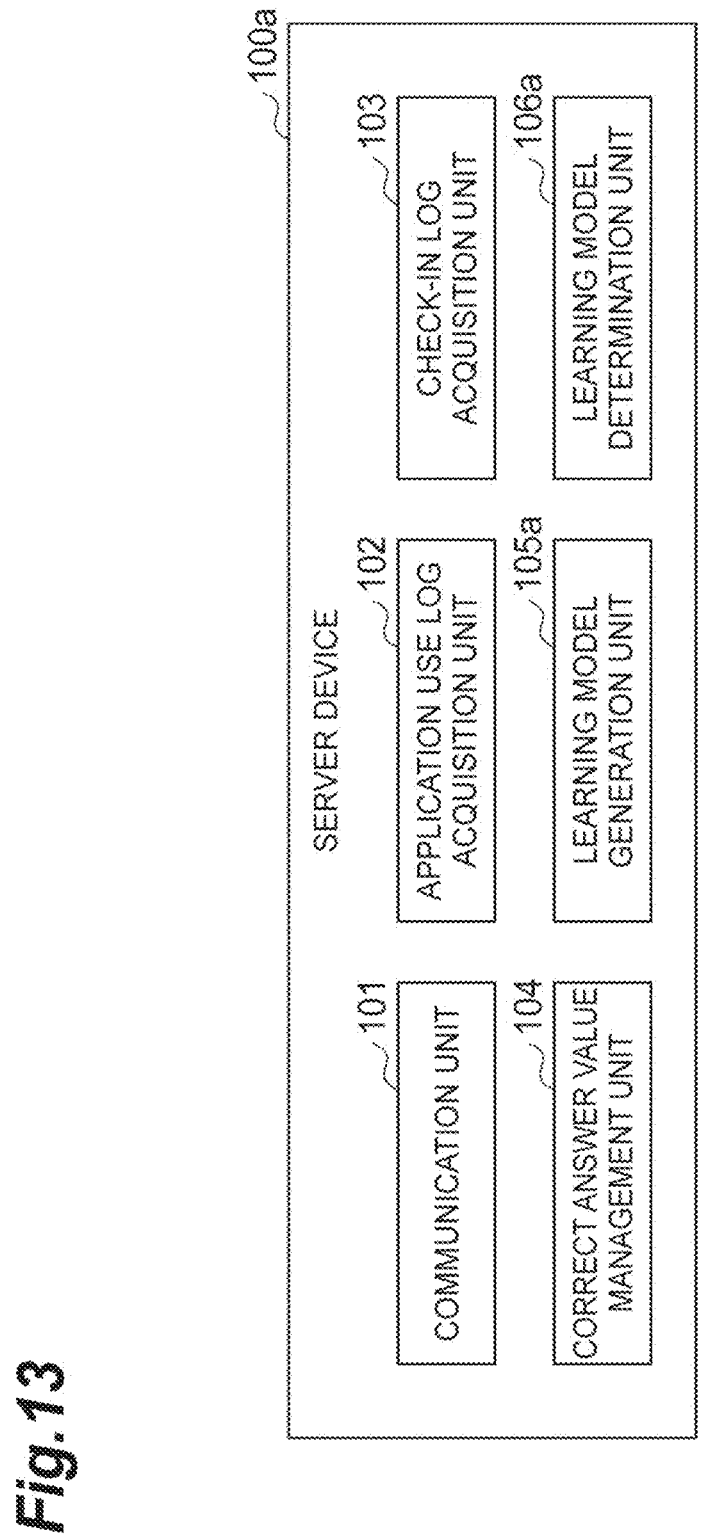
FIG. 13 is a block diagram illustrating a functional configuration of a server device 100a which is a modification example.

FIG. 13 is a block diagram illustrating a functional configuration of a server device 100a which is a modification example. This server device 100a is different from the server device 100 in FIG. 2, in that the server device includes a learning model generation unit 105a (a learning model storage unit) and a learning model determination unit 106a (a moving means determination unit).

The learning model generation unit 105a is a portion that generates and stores a learning model on the basis of check-in points of all users. Hereinafter, a detailed description will be given.

The learning model generation unit 105a acquires log information including a correct answer value determined in advance. This log information is acquired for each user. The correct answer value herein is a correct answer value determined for each moving route.

The learning model generation unit 105a acquires the frequency of check-in at each check-in point in each moving route, an average stay time, and a moving time to an adjacent check-in point for each user.

Log information and objective variables for generating a learning model will be described with reference to FIG. 14. FIGS. 14(a) and 14(b) are diagrams in which log information is simplified. FIG. 14(c) is a diagram illustrating a user's behavior obtained from the log information. Using FIGS. 14(a) and 14(b) as an example, the frequency of check-in is calculated by totaling the number of check-ins of one user who has performed check-in at each check-in point. In a case where a user transfers through several lines, a plurality of correct answer values are present.

Regarding the average stay_time, a stay_time is first calculated on the basis of an in_date and an out_date for each check-in point. The total number of stay_times of a user who has performed check-in for each check-in point is divided by a frequency, whereby the average stay_time for each check-in point is calculated (see FIG. 14(c)).

In addition, an adjacent check-in point is defined in advance for each check-in point, and a moving time to the adjacent check-in point is calculated on the basis of the out_date of a certain check-in point and the in_date of a check-in point adjacent to the check-in point. The average moving time is calculated using a frequency of movement between the same check-in points (see FIG. 14(c)). Since it is usual that a large number of adjacent check-in points are present, a plurality of adjacent check-in points are defined with respect to one check-in point. Adjacent check-in points are different from each other for each check-in point. In FIG. 14(c), in a check-in point 0001 and a check-in point 0002, a moving time of "adjacent P1" is associated. The expression "adjacent P1" represents an adjacent check-in point. For example, a check-in point defined in advance as adjacent P1 is associated with the check-in point 0001. The same is true of the check-in point 0002. "Adjacent P1" of the check-in point 0001 and "adjacent P1" of the check-in point 0002 do not necessarily indicate the same check-in point.

The learning model generation unit 105a uses the frequency of check-in, an average stay_time, and an average moving time of adjacent check-in points for each check-in point calculated for each user (indicating user information including a flag of a line; hereinafter, the user indicates user information including a flag) who has used a designated moving route (line), as explanatory variables, and uses the correct answer value (moving route: line) as an objective variable, to construct a learning model for the entire moving route. A process of constructing a learning model is a well-known process, and is constructed using, for example, an error backward propagation method, a gradient boosting decision tree (GBDT), or the like.

Figure 15:
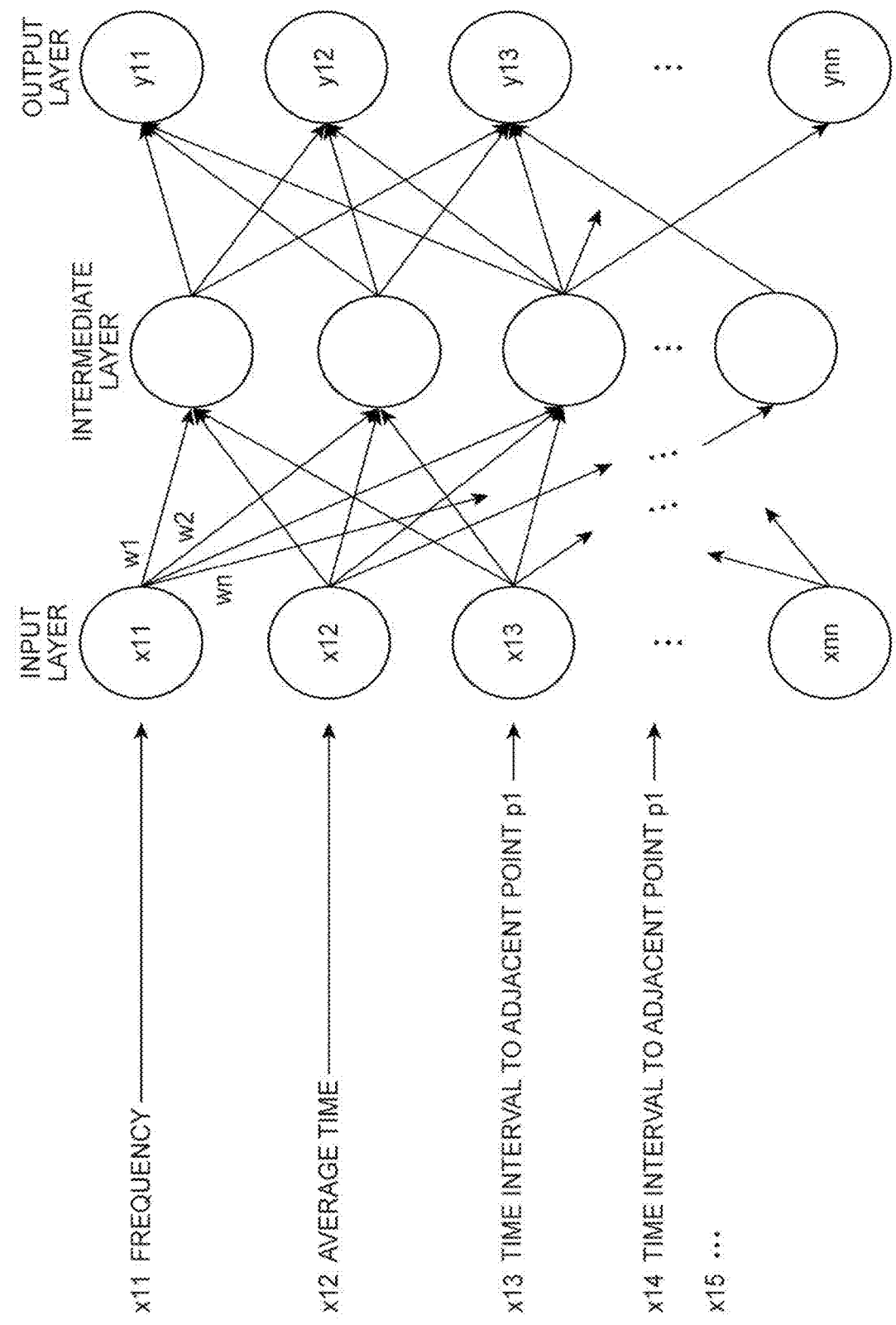
FIG. 15 is a schematic diagram of a learning model in the present disclosure.

FIG. 15 is a schematic diagram of a learning model in the present disclosure. Various types of information (the frequency of check-in, an average stay_time, and a moving time to an adjacent check-in point) calculated from a check-in log or the like are input to input layers x11 to xnn. Meanwhile, these numeric values may be normalized. Output layers y11 to ynn represent moving routes (lines) used by a user, and the output values of the output layers y11 to ynn are represented by 1 or 0 according to whether the values are equal to or greater than a threshold. The output layers y11 to ynn define what lines they correspond to in advance. In addition, w1 to wn represent weights. Such a learning model is learned on the basis of the check-in frequency, the average number of stays, and the average moving time acquired for each user. Meanwhile, in the above description, the check-in frequency, the average number of stays, and the moving time are acquired for each user, and learning is performed, but a learning method is not limited to the above. The check-in frequency, the average number of stays, and the average moving time for all users may be used.

The learning model determination unit 106a is a portion that determines a moving route of each user using a generated learning model.

Figure 16:
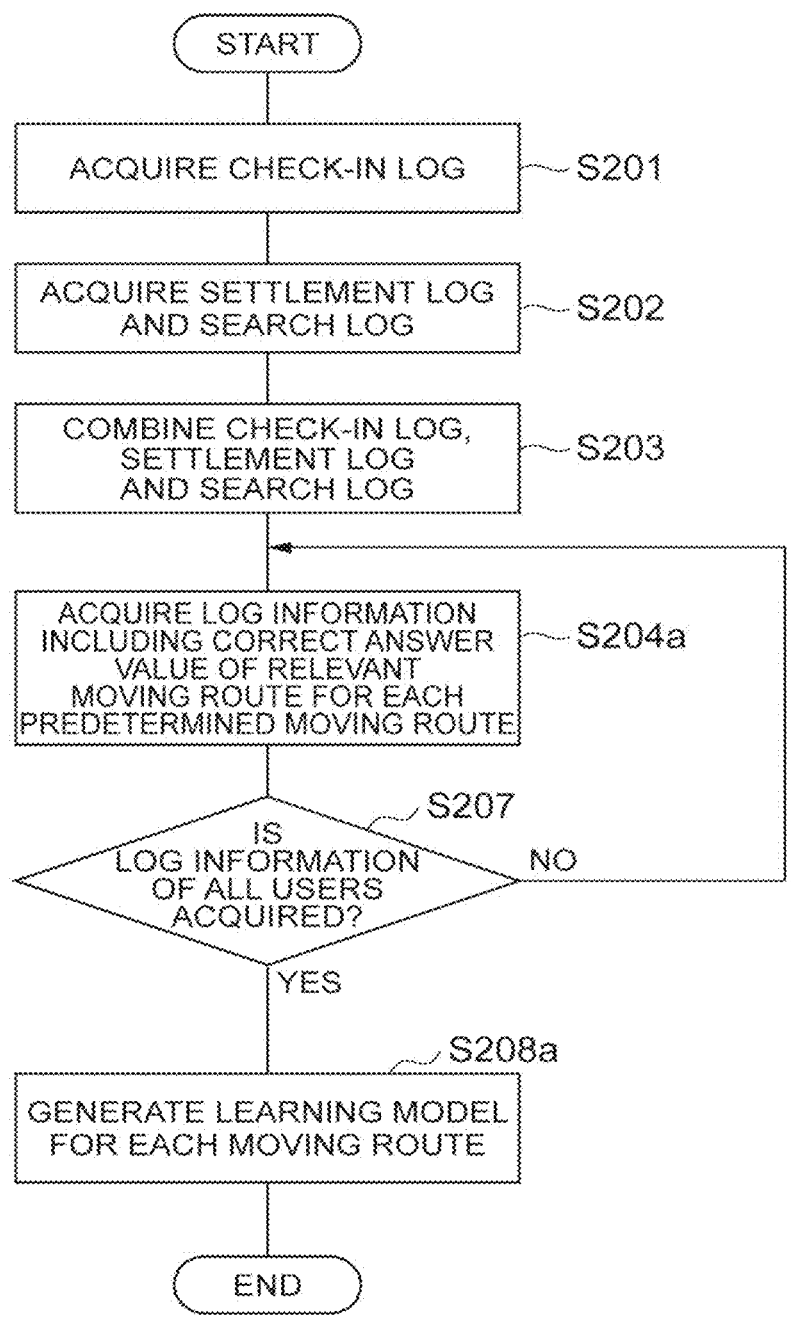

Next, processing of the server device 100a will be described. FIG. 16 is a flow chart illustrating a method of generating a learning model in the server device 100a. As shown in FIG. 16, steps S204a to S208a are replaced with steps S204 to S208 in FIG. 11. In step S204a, the learning model generation unit 105a acquires log information including a correct answer value of the moving route for each user. In step S205a, a process for repeating the process of S204a is performed in order to perform a process for log information of all users.

In step S208a, a learning model for each moving route is generated.

Meanwhile, a moving means and its use route are included in a moving route, but only a moving means may be included therein.

Figure 17:
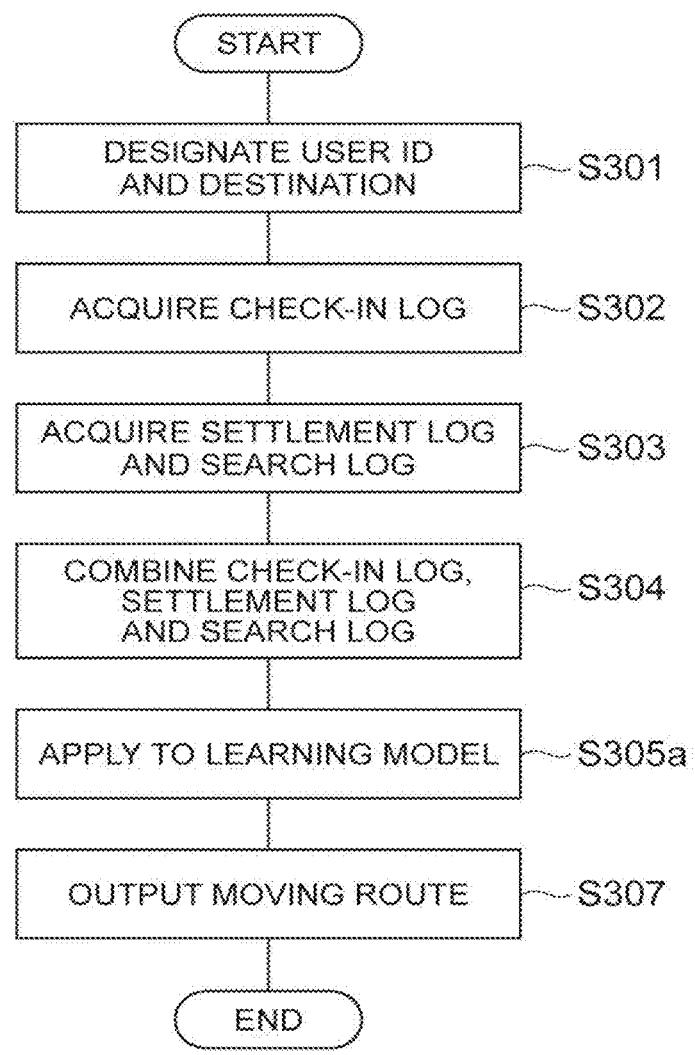
FIG. 17 is a flow chart illustrating a process of applying a learning model and determining a moving route.

FIG. 17 is a flow chart illustrating a process of applying a learning model and determining a moving route. The learning model determination unit 106a applies a check-in log or the like of one user to the learning model (S305a). That is, the frequency of check-in for each check-in point, an average stay_time, and a moving time to an adjacent check-in point are calculated on the basis of the check-in log of one user, and are input as explanatory variables. The learning model determination unit 106a determines and outputs the presence or absence of its use for each use route using the learning model (S307).

Next, the operational effect of the server device 100 (or the server device 100a) in the present disclosure will be described.

The server device 100 in the present disclosure includes the geofence evaluation unit 105 that stores a scoring table (determination information) using a monitoring geofence for determining a moving route of the user terminal 200, the check-in log acquisition unit 103 that acquires at least one of a check-in log which is a history of position management information, such as check-in information or settlement information, indicating that the user terminal 200 is located in a predetermined range and a settlement log as a position management log, and the scoring determination unit 106 that determines the moving route of the user terminal 200 on the basis of the position management log and the scoring table stored in the geofence evaluation unit 105.

With such a configuration, it is possible to determine the moving route using the scoring table or the like, to reduce the amount of data processing, and to improve the accuracy of determination. The moving route indicates a moving means and the use route, and determining the moving route involves determining at least a moving means. The device of the present disclosure is effective in calculating statistical information of means of transportation used by a plurality of users to a destination.

In addition, in the server device 100 of the present disclosure, in a case where the moving route of the user terminal 200 can be determined on the basis of a check-in log (including a settlement log, a search log or the like) or the like including attribute information which is a correct answer value, the scoring determination unit 106 determines the moving route of the user terminal 200 on the basis of the attribute information, and otherwise determines the moving route of the user terminal 200 on the basis of the scoring table.

With such a configuration, it is possible to determine a moving route using the attribute information, and to reduce the amount of its processing. On the other hand, a moving route may not be able to be determined using the attribute information, and the moving route can be determined using a scoring table (determination information) in that case. Thus, it is possible to improve the accuracy of determination of the moving route together with a reduction in the amount of processing.

In addition, in the server device 100, the scoring table has a coefficient associated with a moving route for each check-in point equivalent to position identification information, and the scoring determination unit 106 determines a moving route on the basis of a coefficient corresponding to a check-in point included in the check-in log.

With such a configuration, it is possible to determine a moving route according to a coefficient. Therefore, it is possible to improve the accuracy of determination of the moving route together with a reduction in the amount of processing.

In addition, in the server device 100 (100*a*), the scoring table (or the learning model) includes information for determining a use route in addition to the moving means of the user terminal 200, and the scoring determination unit 106 (or the learning model determination unit 106*a*) determines the moving means of the user terminal 200 and the use route on the basis of the scoring table (determination information).

With such a configuration, it is possible to determine a moving means and its use route as a moving route, and to provide detailed information.

In addition, in the server device 100, the check-in log acquisition unit 103 stores an acquired check-in log or the like (including a settlement log). The server device includes the correct answer value management unit 104 that acquires check-in information or the like satisfying predetermined conditions (for example, check-in information which is a correct answer value is present for about several minutes) among the check-in log and the like of the user terminal 200 as a monitoring geofence (monitoring position identification information), and the geofence evaluation unit 105 that calculates a coefficient for determination for each moving route on the basis of a monitoring geofence. The geofence evaluation unit 105 stores a scoring table in which a determination coefficient for each monitoring geofence and for each moving route is associated.

With such a configuration, it is possible to acquire a monitoring geofence on the basis of a check-in log or the like in each user terminal 200, and to generate a scoring table on the basis thereof. Therefore, it is possible to generate a more realistic scoring table, and to obtain a result having a high degree of accuracy as a result.

In addition, the server device 100*a* of the present disclosure includes the learning model generation unit 105*a* that stores a learning model in which the moving means (such as a moving route or a line) of the user terminal 200 held by a user is constructed on the basis of information indicating a behavior of each user for each check-in point (position identification information), the application use log acquisition unit 102 or the like (log acquisition unit) that acquires a history of check-in information (position management information) indicating that the user terminal 200 is located in predetermined range based on a check-in point (position identification information) as a check-in log (position management log), and the learning model determination unit 106*a* that determines the moving means of the user terminal 200 on the basis of the check-in log (position management log) and the learning model stored in the learning model generation unit 105*a*.

In addition, the learning model generation unit 105*a* acquires check-in information (position management information) indicating that the user terminal 200 is located in a predetermined range based on the check-in point (position identification information) among check-in logs (position management logs) of a plurality of user terminals 200 acquired by the application use log acquisition unit 102 or the like, the check-in information (position management information) satisfying predetermined conditions (including, for example, a correct answer value) established for each moving means. A learning model for each moving means is generated on the basis of information indicating a behavior of each user for each check-in point in the check-in information.

The learning model generation unit 105*a* generates a learning model as information indicating a user's behavior on the basis of a stay time (which may be an average stay_time) at each check-in point, a moving time to a check-in point adjacent to each check-in point, and a frequency at which the user has performed check-in at the check-in point. Meanwhile, a learning model may be generated using any one of the stay time, the moving time, and the frequency of check-in.

In this manner, a learning model is constructed on the basis of the movement pattern of each user, and the movement pattern of a user is determined using the learning model, whereby it is possible to determine a moving means such as a line which is used by the user. Therefore, even when check-in information not including a correct answer value is not directly used, it is possible to determine a moving means to be used such as a line which is used by a user with a good degree of accuracy.

The block diagram used in the description of the above embodiment represents blocks in units of functions. These functional blocks (constituent elements) are realized by any combination of at least one of hardware and software. In addition, a method of realizing each functional block is not particularly limited. That is, each functional block may be realized using one device which is physically or logically coupled, or may be realized using two or more devices which are physically or logically separated from each other by connecting the plurality of devices directly and/or indirectly (for example, using a wired or wireless manner or the like). The functional block may be realized by combining software with the one device or the plurality of devices.

Examples of the functions include determining, deciding, judging, calculating, computing, process, deriving, investigating, search, ascertaining, receiving, transmitting, output, access, resolving, selecting, choosing, establishing, comparing, assuming, expecting, considering, broadcasting, notifying, communicating, forwarding, configuring, reconfiguring, allocating (or mapping), assigning, and the like, but there is no limitation thereto. For example, a functional block (constituent element) for causing transmitting to function is referred to as a transmitting unit or a transmitter. As described above, any realization methods are not particularly limited.

Figure 18:
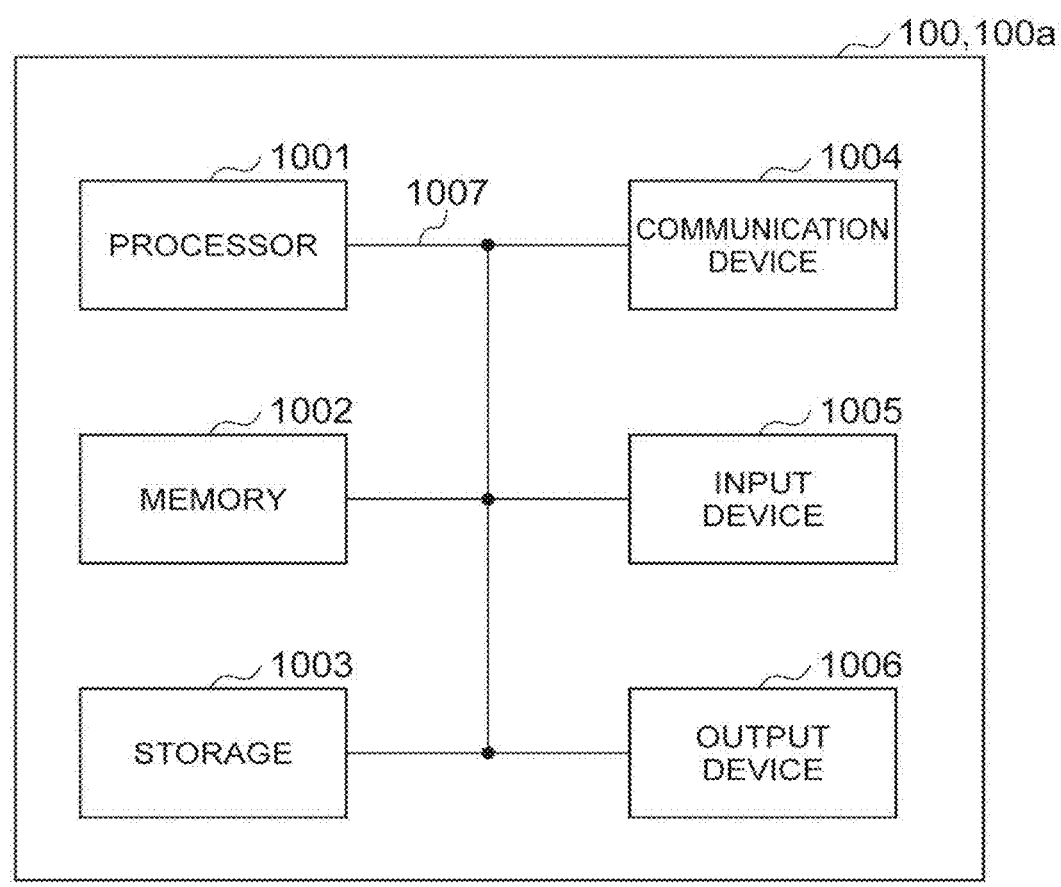
FIG. 18 is a diagram illustrating an example of a hardware configuration of the server device 100 according to an embodiment of the present disclosure.

For example, the server device 100, the server device 100a, or the like according to an embodiment of the present disclosure may function as a computer that performs processing of a moving route determination method of the present disclosure. FIG. 18 is a diagram illustrating an example of a hardware configuration of the server device 100 or the server device 100a according to an embodiment of the present disclosure. The server device 100 or the server device 100a described above may be physically configured as a computer device including a processor 1001, a memory 1002, a storage 1003, a communication device 1004, an input device 1005, an output device 1006, a bus 1007, and the like.

Meanwhile, in the following description, the word "device" can be replaced with a circuit, a unit, or the like. The hardware configurations of the server device 100 and the server device 100a may be configured to include one or a plurality of devices shown in the drawing, or may be configured without including some devices.

The processor 1001 performs an arithmetic operation by reading predetermined software (a program) onto hardware such as the processor 1001 or the memory 1002, and thus each function of the server device 100 and the server device 100a is realized by controlling communication in the communication device 1004 or controlling at least one of reading-out and writing of data in the memory 1002 and the storage 1003.

The processor 1001 controls the whole computer, for example, by operating an operating system. The processor 1001 may be constituted by a central processing unit (CPU) including an interface with a peripheral device, a control device, an arithmetic operation device, a register, and the like. For example, the correct answer value management unit 104, the geofence evaluation unit 105, the scoring determination unit 106, and the like which are described may be above realized by the processor 1001.

In addition, the processor 1001 reads out a program (a program code), a software module, data, or the like from at least one of the storage 1003 and the communication device 1004 into the memory 1002, and executes various types of processes in accordance therewith. An example of the program which is used includes a program causing a computer to execute at least some of the operations described in the foregoing embodiment. For example, the correct answer value management unit 104, the geofence evaluation unit 105, and the scoring determination unit 106 of the server device 100 and the server device 100a are stored in the memory 1002, and may be realized by a control program which is operated in the processor 1001. Similarly, other functional blocks may be realized. The execution of various types of processes described above by one processor 1001 has been described, but these processes may be simultaneously or sequentially executed by two or more processors 1001. One or more chips may be mounted in the processor 1001. Meanwhile, the program may be transmitted from a network through an electrical communication line.

The memory 1002 is a computer readable recording medium, and may be constituted by at least one of, for example, a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store a program (a program code), a software module, or the like that can be executed in order to carry out a moving route determination method according to an embodiment of the present disclosure.

The storage 1003 is a computer readable recording medium, and may be constituted by at least one of, for example, an optical disc such as a compact disc ROM (CD-ROM), a hard disk drive, a flexible disk, a magnetooptic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The foregoing storage medium may be, for example, a database including at least one of the memory 1002 and the storage 1003, a server, or another suitable medium.

The communication device 1004 is hardware (a transmitting and receiving device) for performing communication between computers through at least one of a wired network and a wireless network, and is also referred to as, for example, a network device, a network controller, a network card, a communication module, or the like. The communication device 1004 may be configured to include a high-frequency switch, a duplexer, a filter, a frequency synthesizer, or the like in order to realize at least one of, for example, frequency division duplex (FDD) and time division duplex (TDD). For example, the above-described communication unit 101 or the like may be realized by the communication device 1004. The communication unit 101 may be mounted in a state of being physically or logically separated into a transmitting unit and a receiving unit.

The input device 1005 is an input device (such as, for example, a keyboard, a mouse, a microphone, a switch, a button, or a sensor) that receives an input from the outside. The output device 1006 is an output device (such as, for example, a display, a speaker, or an LED lamp) that executes an output to the outside. Meanwhile, the input device 1005 and the output device 1006 may be an integrated component (for example, a touch panel).

In addition, respective devices such as the processor 1001 and the memory 1002 are connected to each other through the bus 1007 for communicating information. The bus 1007 may be configured using a single bus, or may be configured using a different bus between devices.

In addition, the server device 100 and the server device 100a may be configured to include hardware such as a microprocessor, a digital signal processor (DSP), an application specific integrated circuit (ASIC), a programmable logic device (PLD), or a field programmable gate array (FPGA), or some or all of the respective functional blocks may be realized by the hardware. For example, the processor 1001 may be mounted using at least one of the hardware.

Notification of information is not limited to the aspects/embodiments described in the present disclosure, and may be performed using other methods. For example, the notification of information may be performed by physical layer signaling (such as downlink control information (DCI) or uplink control information (UCI)), upper layer signaling (such as radio resource control (RRC) signaling, medium access control (MAC) signaling, or broadcast information (such as a master information block (MIB) and a system information block (SIB)), other signals, or combinations thereof. In addition, the RRC signaling may be referred to as an RRC message and may be referred to as, for example, an RRC connection setup message or an RRC connection reconfiguration message.

The aspects/embodiments described in the present disclosure may be applied to at least one of a system employing long term evolution (LTE), LTE-Advanced (LTE-A), SUPER 3G, IMT-Advanced, a 4th generation mobile communication system (4G), a 5th generation mobile communication system (5G), future radio access (FRA), new Radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended on the basis thereof. In addition, a plurality of systems may be combined (for example, 5G and at least one of LTE and LTE-A are combined or the like) and be applied.

The order of the processing sequences, the sequences, the flow charts, and the like of the aspects/embodiments described above in the present disclosure may be changed as long as they are compatible with each other. For example, in the methods described in the present disclosure, various steps as elements are presented using an exemplary order but the methods are not limited to the presented order.

The input or output information or the like may be stored in a specific place (for example, a memory) or may be managed using a management table. The input or output information or the like may be overwritten, updated, or added. The output information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison thereof with a predetermined value).

The aspects described in the present disclosure may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

Hereinbefore, the present disclosure has been described in detail, but it is apparent to those skilled in the art that the present disclosure should not be limited to the embodiments described in the present disclosure. The present disclosure can be implemented as modified and changed aspects without departing from the spirit and scope of the present disclosure, which are determined by the description of the scope of claims. Therefore, the description of the present disclosure is intended for illustrative explanation only, and does not impose any limited interpretation on the present disclosure.

Regardless of whether it is called software, firmware, middleware, microcode, hardware description language, or another name, software can be widely construed to refer to an instruction, an instruction set, codes, code segments, program codes, a program, a sub-program, a software module, an application, a software application, a software package, a routine, a sub-routine, an object, an executable file, an execution thread, an order, a function, or the like.

In addition, software, a command, information, and the like may be transmitted and received through a transmission medium. For example, when software is transmitted from a website, a server, or another remote source using at least one of wired technology (such as a coaxial cable, an optical fiber cable, a twisted-pair wire, or a digital subscriber line (DSL)) and wireless technology (such as infrared rays or microwaves), at least one of the wired technology and the wireless technology are included in the definition of a transmission medium.

Information, a signal or the like described in the present disclosure may be expressed using any of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or any combination thereof.

Meanwhile, the terms described in the present disclosure and the terms required for understanding the present disclosure may be substituted by terms having the same or similar meanings. For example, at least one of a channel and a symbol may be a signal (signaling). In addition, the signal may be a message. In addition, a component carrier (CC) may be referred to as a carrier frequency, a cell, a frequency carrier, or the like.

The terms "system" and "network" which are used in the present disclosure are used interchangeably.

In addition, information, parameters, and the like described in the present disclosure may be expressed using absolute values, may be expressed using values relative to a predetermined value, or may be expressed using other corresponding information. For example, radio resources may be indicated by indices.

In the present disclosure, the terms "mobile station (MS)," "user terminal," "user equipment (UE)," "terminal," and the like may be used interchangeably.

A user terminal may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

The user terminal 200 may be referred to as a transmitting device, a receiving device, a communication device, or the like. Meanwhile, the user terminal 200 may be a device mounted in a moving object, the moving object itself, or the like. The moving object may be a vehicle (such as, for example, a car or an airplane), may be a moving object that moves in an unmanned manner (such as, for example, a drone or an automated driving vehicle), or may be a robot (manned type or unmanned type). Meanwhile, the user terminal 200 also includes a device that does not necessarily move during a communication operation. For example, the user terminal 200 may be an internet of things (IoT) instrument such as a sensor.

The term "determining" which is used in the present disclosure may include various types of operations. The term "determining" may include regarding operations such as, for example, judging, calculating, computing, processing, deriving, investigating, looking up/search/inquiry (for example, looking up in a table, a database or a separate data structure), or ascertaining as an operation such as "determining" In addition, the term "determining" may include regarding operations such as receiving (for example, receiving information), transmitting (for example, transmitting information), input, output, or accessing (for example, accessing data in a memory) as an operation such as "determining" In addition, the term "determining" may include regarding operations such as resolving, selecting, choosing, establishing, or comparing as an operation such as "determining" That is, the term "determining" may include regarding some kind of operation as an operation such as "determining." In addition, the term "determining" may be replaced with the term "assuming," "expecting," "considering," or the like.

An expression "on the basis of ~" which is used in the present disclosure does not refer to only "on the basis of only ~," unless otherwise described. In other words, the expression "on the basis of ~" refers to both "on the basis of only ~" and "on the basis of at least ~."

In the present disclosure, when the terms "include" and "including" and modifications thereof are used, these terms are intended to have a comprehensive meaning similarly to the term "comprising." Further, the term "or" which is used in the present disclosure is intended not to mean an exclusive logical sum.

In the present disclosure, when articles are added by translation like, for example, "a," "an" and "the" in English, the present disclosure may include that nouns that follow these articles are plural forms.

In the present disclosure, an expression "A and B are different" may mean that "A and B are different from each other." Meanwhile, the expression may mean that "A and B are different from C." The terms "separated," "coupled," and the like may also be construed similarly to "different."

REFERENCE SIGNS LIST

100: Server device
100a: Server device
101: Communication unit
102: Application use log acquisition unit
103: Check-in log acquisition unit
104: Correct answer value management unit
105: Geofence evaluation unit
105a: Learning model generation unit
106: Scoring determination unit
106a: Learning model determination unit
200: User terminal
200a: Settlement device
201: Communication unit
202: Position information measurement unit
203: Check-in determination unit
204: Check-in log accumulation unit
205: Application use log accumulation unit
300: Position log management server
400: Search history management server
500: Settlement log management server

The invention claimed is:

1. A moving means determination device comprising:
processing circuitry configured to
store, in a memory, a scoring table for determining a moving route of railroad of a user terminal held by a user using monitoring geofence determined based on a check-in point determined for determination;
acquire a history of position management information indicating that the user terminal is located in a geofence range based on a predetermined check-in point as a position management log; and
determine the moving route of railroad of the user terminal on the basis of the position management log and the scoring table stored in the memory,
wherein in the scoring table, a predetermined coefficient is assigned to each moving route with respect to the monitoring geofence, and
wherein the processing circuitry determines the moving route by adding up the coefficients corresponding to the position, when a position associated with the movement of the user is within the monitoring geofence.

2. The moving means determination device according to claim 1, wherein the processing circuitry determines the moving route of railroad of the user terminal on the basis of the position management log including attribute information which is a correct answer value for identifying a moving route of railroad, and determines the moving route of railroad of the user terminal on the basis of the scoring table in a case where the determination is impossible.

3. The moving means determination device according to claim 1, wherein the processing circuitry is further configured to:
acquire a check-in-point of position management information, satisfying predetermined conditions among position management logs of a plurality of user terminals acquired, as a monitoring check-in-point; and
calculate a coefficient for each moving route of railroad on the basis of the monitoring check-in-point,
store, in the memory, a database for determination, having a coefficient associated for each piece of the monitoring check-in-point and for each moving route of railroad, as the scoring table.

4. The moving means determining device according to claim 1,
wherein the predetermined coefficient for each moving route is a sum of an appearance frequency coefficient indicating a frequency of being located in the monitoring geofence and a stay time coefficient at that time.

5. A moving means determination device comprising processing circuitry configured to:
store, in a memory, a learning model in which a moving route of railroad of a user terminal held by a user is constructed on the basis of information indicating a behavior of each user for each check-in point;
acquire a history of position management information indicating that the user terminal is located in a range based on a predetermined check-in-point as a position management log; and
determine the moving route of railroad in which the user terminal moves, on the basis of the position management log and the learning model stored in the memory,
wherein the learning model is learned by using information indicating a user's behavior and a moving time to a geofence adjacent to each geofence as an explanatory variable, and the moving route of the railway as a target variable, and the information indicating the user's behavior is at least one of a frequency at which the user is located within a geofence based on a check-in point, a staying time at each geofence.

6. The moving means determination device according to claim 5, wherein the processing circuitry is further configured to:
   acquire position management information indicating that the user terminal is located in a range based on a predetermined check-in-point among position management logs of a plurality of user terminals acquired, the position management information satisfying predetermined conditions established for each moving route of railroad; and
   generate a learning model for each moving route of railroad on the basis of information indicating a behavior of each user for each check-in-point in the position management information.

7. A method, implemented by processing circuitry of a moving means determination device, comprising:
   storing, in a memory, a scoring table for determining a moving route of railroad of a user terminal held by a user using monitoring geofence determined based on a check-in point determined for determination;
   acquiring a history of position management information indicating that the user terminal is located in a geofence range based on a predetermined check-in point as a position management log; and
   determining the moving route of railroad of the user terminal on the basis of the position management log and the scoring table stored in the memory,
   wherein in the scoring table, a predetermined coefficient is assigned to each moving route with respect to the monitoring geofence, and
   wherein the processing circuitry determines the moving route by adding up the coefficients corresponding to the position, when a position associated with the movement of the user is within the monitoring geofence.

* * * * *